United States Patent
Nandy et al.

(10) Patent No.: US 11,171,796 B2
(45) Date of Patent: Nov. 9, 2021

(54) MANAGING MULTICAST SCALING

(71) Applicant: HEWLETT PACKARD ENTERPRISE DEVELOPMENT LP, Houston, TX (US)

(72) Inventors: Tathagata Nandy, Bangalore (IN); Nilay Tripathi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 759 days.

(21) Appl. No.: 15/464,522

(22) Filed: Mar. 21, 2017

(65) Prior Publication Data
US 2017/0373927 A1   Dec. 28, 2017

(30) Foreign Application Priority Data
Jun. 23, 2016  (IN) .............................. 201641021609

(51) Int. Cl.
  *H04L 12/18*   (2006.01)
  *H04L 29/08*   (2006.01)
  *H04L 29/06*   (2006.01)

(52) U.S. Cl.
  CPC ........ *H04L 12/185* (2013.01); *H04L 67/1046* (2013.01); *H04L 63/1458* (2013.01)

(58) Field of Classification Search
  None
  See application file for complete search history.

(56) References Cited

U.S. PATENT DOCUMENTS

| | | | | |
|---|---|---|---|---|
| 5,951,651 | A  * | 9/1999 | Lakshman | H04L 29/06 370/351 |
| 6,401,242 | B1 * | 6/2002 | Eyer | H04N 5/44543 348/E5.002 |
| 6,556,547 | B1 * | 4/2003 | Srikanth | H04L 45/00 370/317 |
| 7,054,930 | B1 * | 5/2006 | Cheriton | H04L 63/0263 370/390 |
| 7,359,939 | B2 | 4/2008 | Poulsen et al. | |
| 7,551,629 | B2 * | 6/2009 | Chen | H04L 67/28 370/352 |
| 7,593,402 | B2 * | 9/2009 | Song | H04L 12/18 370/390 |
| 7,653,753 | B2 * | 1/2010 | Chen | H04L 45/306 709/238 |

(Continued)

OTHER PUBLICATIONS

"IP Multicast Optimization: IGMP State Limit," Oct. 10, 2013, pp. 1-8, Cisco Systems, Inc.

*Primary Examiner* — Gregory B Sefcheck
(74) *Attorney, Agent, or Firm* — Hewlett Packard Enterprise Patent Department

(57) ABSTRACT

Some examples relate to managing multicast scaling. In an example, a network device may receive a message to join an IP multicast group. The network device may determine whether a hardware filter is available on the network device to process the received message. In response to the determination that the hardware filter is not available on the network device to process the received message, a current state of an IP multicast protocol associated with the message may be changed to an error state on the network device, wherein in the error state, further messages to join the IP multicast group that are received by the network device are discarded by the network device.

15 Claims, 4 Drawing Sheets

(56) References Cited

U.S. PATENT DOCUMENTS

| | | | | |
|---|---|---|---|---|
| 7,701,938 B1* | 4/2010 | Bernstein | ............... | H04L 12/185 |
| | | | | 370/270 |
| 7,779,126 B1* | 8/2010 | Cheriton | ............ | H04L 63/0263 |
| | | | | 709/226 |
| 7,792,112 B2* | 9/2010 | Niu | ....................... | H04L 12/185 |
| | | | | 370/390 |
| 8,116,312 B2* | 2/2012 | Riddoch | ................. | H04L 49/90 |
| | | | | 370/389 |
| 8,174,972 B2* | 5/2012 | Cernius | ................. | H04L 12/185 |
| | | | | 370/229 |
| 8,463,933 B2 | 6/2013 | Harrang et al. | | |
| 8,532,107 B1* | 9/2013 | Ghosh | ................. | H04L 12/4633 |
| | | | | 370/392 |
| 8,559,427 B2* | 10/2013 | Shah | ................... | H04L 12/4625 |
| | | | | 370/390 |
| 8,817,784 B2* | 8/2014 | Riddoch | ................. | H04L 49/90 |
| | | | | 370/389 |
| 8,938,527 B2* | 1/2015 | Bahls | ................... | H04L 12/2874 |
| | | | | 709/223 |
| 9,083,539 B2* | 7/2015 | Riddoch | ................. | H04L 49/90 |
| 9,124,504 B2 | 9/2015 | Dutta et al. | | |
| 9,331,861 B2* | 5/2016 | Bos | ....................... | H04L 12/185 |
| 9,594,842 B2* | 3/2017 | Pope | ....................... | H04L 45/742 |
| 2008/0112324 A1 | 5/2008 | Li et al. | | |

* cited by examiner

MANAGING MULTICAST SCALING

BACKGROUND

Multicast technology is being increasingly favored to provide rich content over a network. Multicast is a mechanism for transmitting data from a single source (for example, a server) to multiple receivers (for example, personal computers) on a network. Multicast packets are replicated down appropriate paths in a network to create the most efficient routing mechanism possible. The sender may send a data packet once, even if the packet is to be delivered to multiple receivers.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
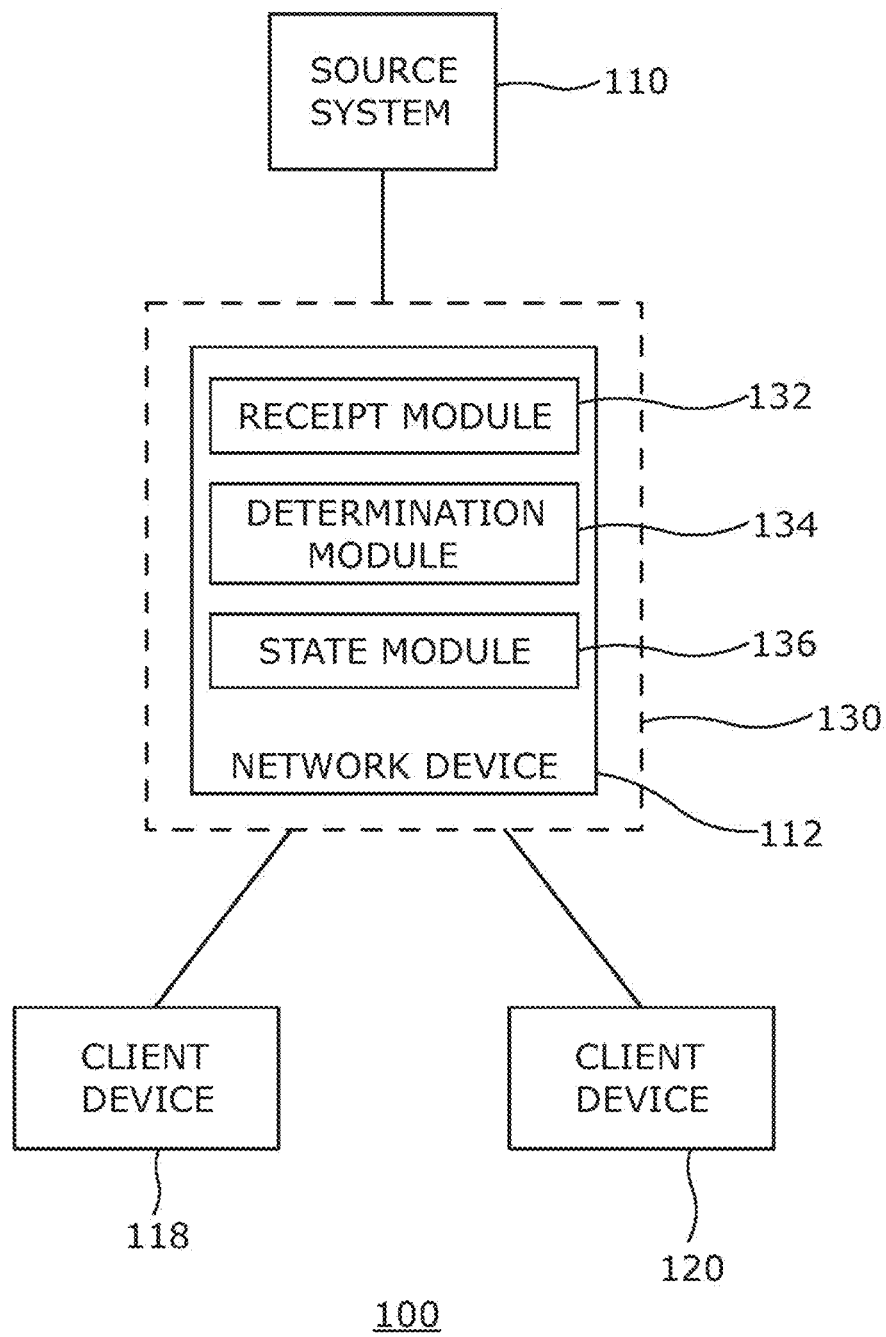
FIG. 1 is a block diagram of an example computing environment for managing multicast scaling.

Multicast technology may be used by organizations to send data (especially, multimedia content) over a network. Multicast technology may allow host computer systems, who have subscribed to a particular content data flow of a content server, to receive the content. Host systems may signify their willingness to receive a particular data from a content server by joining a particular multicast group. Once host systems join a particular group, a multicast distribution tree may be created for that group. The flow of data from a multicast source system to receiver devices may be managed by a multicast protocol. Some non-limiting examples of protocols that may be used to manage flow of data in a multicast system may include Internet Group Management Protocol (IGMP), Multicast Listener Discovery (MLD) protocol, Protocol Independent Multicast (PIM), and Distance Vector Multicast Routing Protocol (DVMRP).

The Internet Group Management Protocol (IGMP) is an Internet protocol that may be used by IPv4 systems (hosts and routers) to report their IP multicast group memberships to any neighboring multicast routers. The protocol may be used between end systems (hosts) and a multicast router to request data for a given multicast group. Multicast Listener Discovery (MLD) protocol is a component of the Internet Protocol Version 6 (IPv6) suite. MLD is used by IPv6 routers for discovering multicast listeners on a directly attached link, much like IGMP is used in IPv4.

IP multicast may allow content providers to offer high quality service to customers while efficiently utilizing network bandwidth. However, a multicast deployment may face security-related challenges. For example, a multicast infrastructure may be vulnerable to Denial of Service (DoS) attacks. In an example deployment of an IP multicast protocol in a LAN, the protocol application may maintain the multicast group information and program the hardware filters on network devices to define the multicast data traffic behavior. Hardware filters may be provided as a port map where the intended ports to receive the multicast traffic are programmed. The number of hardware filters may be limited by the ASIC type. However, there's no limit on the number of multicast groups (for example, standard or static multicast groups) that may be added to a network device. Since all groups (including filtered multicast groups) may be tracked in a protocol application (for example, IGMP), a DoS attack may cause filter exhaustion in a network device that may eventually crash the device. One example of such DoS attack may include flooding an access network device with a large number of IGMP join messages that may lead to hardware filter exhaustion and device failure in the event of a crash. This is not a desirable scenario.

To address this issue, the present disclosure describes various examples for managing multicast scaling. In an example, a network device may receive a message to join an IP multicast group from a host or client device on a network. In response, the network device may determine whether hardware filters defined for processing IP multicast messages on the network device are exhausted. In response to the determination that the hardware filters defined for processing IP multicast messages on the network device are exhausted, the current state of an IP multicast protocol associated with the message may be changed to an error state on the network device, wherein in the error state further messages to join an IP multicast group that are received by the network device are not processed by the network device.

The proposed solution provides a mechanism for limiting the number of multicast groups that may be added to a network device. It provides a mechanism to handle a scenario where a network device may be subjected to a DoS attack, for example, by receiving a large number of distinct IGMP or MLD join packets. The issue of scale may be handled by placing the IP multicast protocol on the network device in a new error state when the hardware support limit for the multicast groups associated with the protocol gets exhausted.

FIG. 1 is a block diagram of an example computing environment 100 for managing multicast scaling. In an example, computing environment 100 may include a source system 110, a network device 112, and client devices 118 and 120. Although one source system, one network device, and two client computing devices are shown in FIG. 1, other examples of this disclosure may include more than one source system, more than one network device, and more or less than two client computing devices.

Source system 110, network device 112, and client computing devices 118 and 120, may be communicatively coupled, for example, via a computer network 130. Such a computer network 130 may be a wireless or wired network. Such a computer network 130 may include, for example, a Local Area Network (LAN), a Wireless Local Area Network (WAN), a Metropolitan Area Network (MAN), a Storage Area Network (SAN), a Campus Area Network (CAN), or the like. Further, such a computer network 130 may be a public network (for example, the Internet) or a private network (for example, an intranet). In an example, computer network 130 may be an IPv4 or IPv6 network. In an example, computer network 130 may be used to transmit and route multicast content.

Source system 110 may be any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like. In an example, source system 110 may host multicast content. Multicast content may include, for example, data, image, audio, video, multimedia, and other like content. Multicast content may be shared with host computer systems (also known as multicast subscribers) through network device 112.

Network device 112 may include, for example, a router, a virtual router, a network switch, and a virtual switch. In an example, network device 112 may be a multicast router. Network device 112 may be used to route multicast data from source system 110 to a client computing device(s) (for example, 118 and 120).

Client computing devices 118 and 120 may each be any type of computing device that is capable of executing machine-readable instructions. Examples of the computing device may include, without limitation, a server, a desktop computer, a notebook computer, a tablet computer, a thin client, a mobile device, a personal digital assistant (PDA), a phablet, and the like. Client computing devices 118 and 120 may each include a client or multicast application for receiving multicast data from a source system (for example, 110).

Multicast technology may allow client computing devices (for example, 118 and 120), who may have subscribed to a particular content data flow of a source system (for example, 110), to receive content from the source system. Client devices (for example, 118 and 120) may signify their willingness to receive a particular data from a content server by joining a particular multicast group. Once client devices join a particular group, a multicast distribution tree may be created for that group. The flow of data from a multicast source system to receiver devices over network 130 may be managed by a multicast protocol. Examples of multicast protocol may include Internet Group Management Protocol (IGMP) and Multicast Listener Discovery (MLD) protocol.

IGMP and MLD may be used between client computing devices (for example, 118 and 120) and a multicast router (for example, 112) to request data for a given multicast group. Routers may use IGMP or MLD to build their multicast routing table.

In an example, network device 112 may include a receipt module 132, a determination module 134, and a state module 136. The term "module" may refer to hardware, or a combination of hardware and instructions (e.g. software or firmware), such as the examples described below. A module may include, by way of example, a processor and a non-transitory machine-readable storage medium comprising machine-readable instructions or code executable by the processor to perform a functionality described herein. The processor may be any type of Central Processing Unit (CPU), microprocessor, Application Specific Integrated Circuit (ASIC), or processing logic that interprets and executes machine-readable instructions stored on the machine-readable medium. The machine-readable storage medium may be a random access memory (RAM) or another type of dynamic storage device that may store information and machine-readable instructions that may be executed by the processor. For example, machine-readable storage medium may be Synchronous DRAM (SDRAM), Double Data Rate (DDR), Rambus DRAM (RDRAM), Rambus RAM, a hard disk drive, etc. In another example, a module may include a non-transitory machine-readable storage medium comprising machine-readable instructions executable by a processor to perform a functionality described herein. In another example, the module may include hardware circuitry to perform a functionality described herein.

In an example, receipt module 132 on network device 112 may receive an unsolicited message from a client device (for example, 118) to join an IP multicast group. The unsolicited join message may specify the IP multicast group that the client device may wish to join. The unsolicited join message may be an IGMP join message or a MLD join message. The multicast group specified in the join request may be determined by the requesting application running on the client device. In another example, network device 112 may receive a general query from an upstream router (not shown) that may be coupled to the source system 110. In response, network device 112 may forward the query to all ports in a VLAN. A client device (for example, 118) that wants to join the multicast group may respond by sending a join message to the network device 112.

Thus, a client or host device (for example, 118) may join a multicast group in two ways: a) by sending an unsolicited IGMP or MLD join message to network device 112 that specifies the IP multicast group that the client may like to join, and b) by sending an IGMP or MLD join message in response to a general query from network device 112.

In response to receiving a message from a client device (for example, 118) to join an IP multicast group, determination module 134 on network device 112 may determine whether a hardware filter is available on the network device 112 to process the received message. The number of hardware filters available on a network device (for example, 112) to process IP multicast messages (for example, a join message) may depend on the type of network device. In an example, up to 2048 hardware filters may be available on network device 112 for processing IP multicast messages of an IP multicast protocol (for example, IGMP and MLD). If multiple VLANs are configured, each filter may be counted once per VLAN in which it is used.

Thus, a certain number of hardware filters may be available or defined on network device 112 for processing requests received from client devices to join an IP multicast group(s). Upon receiving a request to join an IP multicast group on network device 112, determination module 134 may determine whether hardware filters defined for processing IP multicast messages on the network device 112 are exhausted. In other words, determination module 134 may determine if no hardware filters are available to process the join request received by network device 112. For example, upon receiving an IGMP join request message, determination module 134 on network device 112 may determine whether a hardware filter is available on the device to process the request.

In response to the determination by determination module 134 that no hardware filter is available to process the join request received by network device 112, state module 136 may change current state of an IP multicast protocol (for example, IGMP and MLD) associated with the message to an "error" state on the network device 112. Thus, in response to the determination that no hardware filter may be available on network device 112 to process a new message(s) to join an IP multicast group(s), state module 136 may place current state of an IP multicast protocol associated with the message to an error state on the network device 112.

In the error state, further messages to join an IP multicast group that are received by network device 112 are discarded by network device. Network device 112 may not process any new IP multicast group join request messages from a client device(s). This may help network device 112 prevent a DoS attack that may be carried out, for example, by sending a large number of join request messages to the network device 112.

In the error state, all filtered group entries that relate to (*, G) and (S, G) multicast groups may be deleted from the network device 112. The notation (S, G) enumerates a shortest path tree (SPT) structure of a multicast distribution tree, where S represents the IP address of the source and G represents the multicast group address. The (S, G) notation indicates that a separate SPT may exist for each individual source that sends multicast data to the group. The notation (*, G) enumerates a common shared tree structure of a multicast distribution tree, where * represents all sources and G represents the multicast group address.

In an example, deletion of filtered group entries from network device 112 may be preceded by setting the default filter on network device as flood filter. The default filter may include a default action that is applied when an unknown multicast traffic is received at network device 112. The default filter may be either flood or data driven. The flood filter may be a single global filter that may be defined on network device 112 with all the ports on the device are set. The presence of a flood filter indicates a flood behavior. In an example, when IGMP is not enabled in a VLAN, the default filter may be a flood filter.

The setting of default filter on network device 112 as flood filter and deletion of filtered group entries from network device 112 may cause flooding of unknown multicast traffic to flood on all ports of network device 112. In other words, if unknown multicast traffic is received on network device 112 during the error state, the traffic may be may flooded to all ports of network device. This ensures that client devices keep on receiving multicast traffic and there's no disruption in multicast service when the network device 112 is in error state. Further, in the error state, the existing multicast traffic stays unaffected as no indication is sent to the upstream network devices.

IP multicast protocol associated with the message may come out of the error state on the network device 112 through various ways. In an example, a new command may be used to bring the associated IP multicast protocol out of the error state. In an example, in case IGMP is used as the IP multicast protocol, the command may be: #igmp reload. In an example, in case MLD is used as the IP multicast protocol, the command may be: #mld reload. The new command may be provided, for example, through a suitable interface. Some of the example interfaces may include a web interface, a Simple Network Management Protocol (SNMP) interface, and a Command Line Interface (CLI). In an example, in the error state, if multicast show commands (for example, show ip igmp groups interface-name command) are run, network device 112 may notify a user of the error state and suggests the command to recover from the error state.

In another example, IP multicast protocol associated with the message may be brought out of the error state on the network device 112 by removing or disabling the IP multicast protocol (for example, IGMP and MLD) configuration from the network device 112. In another example, IP multicast protocol associated with the message may be automatically recovered from the error state on the network device 112 by monitoring resource availability after periodic intervals. If the resource availability meets a pre-defined criterion, IP multicast protocol may be brought out of the error state. In an example, the error state may be tagged to a SNMP trap to alert a user (for example, a network administrator).

Figure 2:
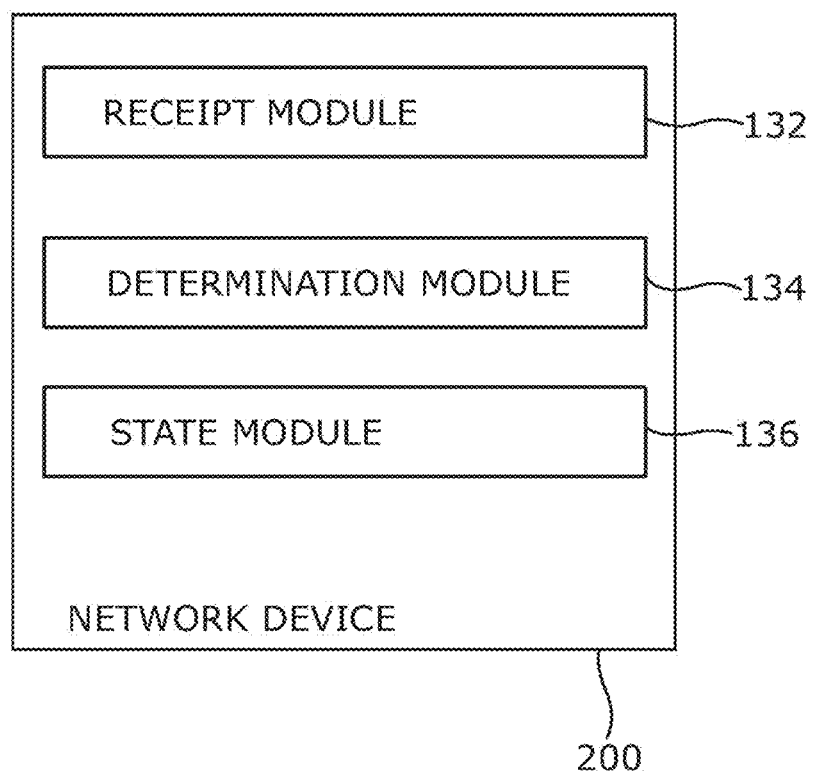
FIG. 2 is a block diagram of an example network device for managing multicast scaling.

FIG. 2 is a block diagram of an example network device 200 for managing multicast scaling. In an example, network device 200 may be analogous to network device 112 FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. The components or reference numerals may be considered alike.

Network device 200 may be, for example, a router, a virtual router, a network switch, and a virtual switch. In an example, network device 200 may be a multicast router. Network device 200 may be used to route multicast data from a source system to client computing device (i.e. multicast receivers). In an example, network device 200 may include a receipt module 132, a determination module 134, and a state module 136.

In an example, receipt module 132 on network device 200 may receive a message to join an IP multicast group. In response, determination module 134 may determine whether a hardware filter is available on the network device 200 to process the received message. In response to the determination by determination module 134 that the hardware filter is not available on the network device 200 to process the received message, state module 136 may change current state of an IP multicast protocol associated with the message to an error state on the network device 200 to an error state. In the error state further messages to join an IP multicast group that are received by the network device are discarded by the network device 200.

Figure 3:
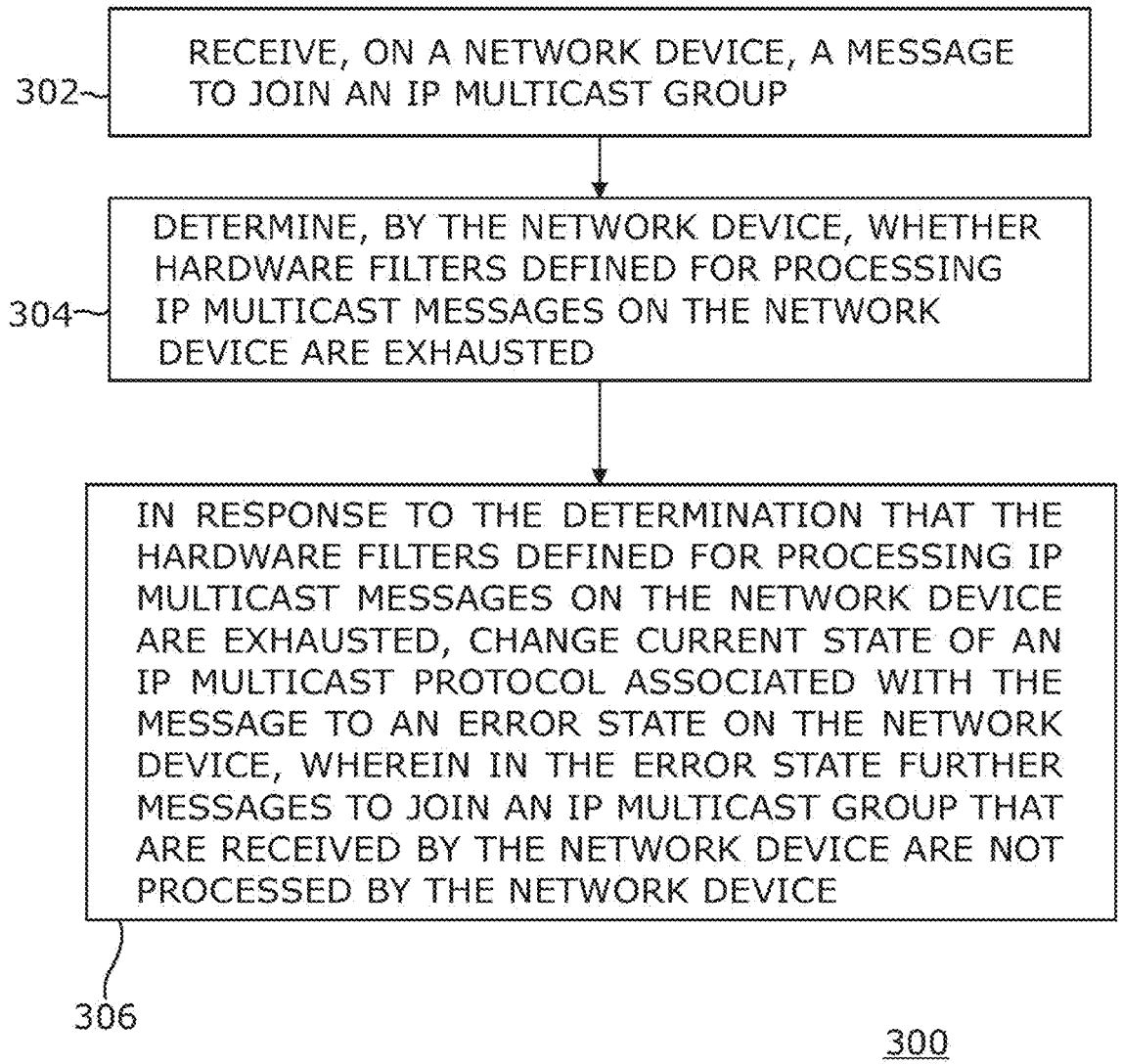
FIG. 3 is a flowchart of an example method for managing multicast scaling.

FIG. 3 is a flowchart of an example method 300 for managing multicast scaling. The method 300, which is described below, may at least partially be executed on a network device, for example, network device 112 of FIG. 1 or network device 200 of FIG. 2. However, other computing devices may be used as well. At block 302, a network device may receive a message from a client device to join an IP multicast group. At block 304, the network device may determine whether hardware filters defined for processing IP multicast messages on the network device are exhausted. At block 306, in response to the determination that the hardware filters defined for processing IP multicast messages on the network device are exhausted, the current state of an IP multicast protocol associated with the message to an error state on the network device, wherein in the error state further messages to join an IP multicast group that are received by the network device are not processed by the network device.

Figure 4:
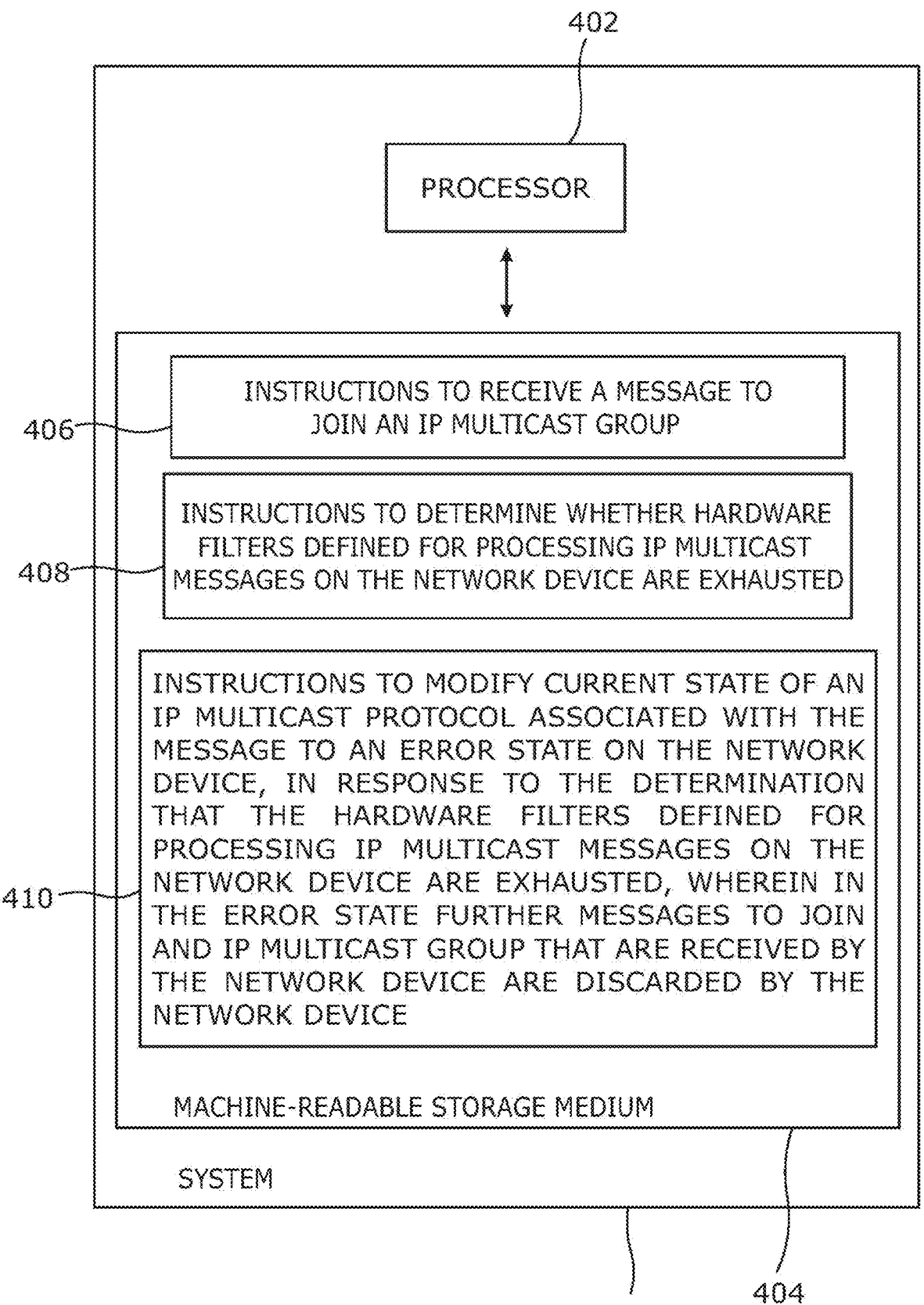
FIG. 4 is a block diagram of an example system for managing multicast scaling.

FIG. 4 is a block diagram of an example system 400 for managing multicast scaling. System 400 includes a processor 402 and a machine-readable storage medium 404 communicatively coupled through a system bus. In an example, system 400 may be analogous to network device 112 of FIG. 1 or network device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 404 may be a non-transitory machine-readable medium. Machine-readable storage medium 404 may store instructions 406, 408, and 410. In an example, instructions 406 may be executed by processor 402 to receive a message from a client device to join an IP multicast group. Instructions 408 may be executed by processor 402 to determine whether hardware filters defined for processing IP multicast messages on the network device are exhausted. Instructions 410 may be executed by processor 402 to modify current state of an IP multicast protocol associated with the message to an error state on the network device, in response to the determination that the hardware filters defined for processing IP multicast messages on the network device are exhausted. In the error state further messages to join an IP multicast group that are received by the network device are discarded by the network device.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method of managing multicast scaling, comprising:
   receiving, on a network device, a request message to join an Internet Protocol (IP) multicast group;
   in response to receipt of the request message to join the IP multicast group, determining, by the network device, whether any hardware filters for processing IP multicast messages on the network device are available to process the request message; and
   in response to a determination that no hardware filters on the network device are available to process the request message, changing a current state of an IP multicast protocol associated with the request message to an error state on the network device, wherein in the error state, further request messages to join the IP multicast group that are received by the network device are discarded by the network device.

2. The method of claim 1, further comprising flooding the further request messages to all ports of the network device during the error state.

3. The method of claim 1, wherein the IP multicast protocol includes one of Internet Group Management Protocol (IGMP) and Multicast Listener Discovery (MLD) protocol.

4. The method of claim 1, further comprising: during the error state, deleting filtered IP multicast group entries from the network device.

5. The method of claim 4, wherein the filtered IP multicast group entries relate to one of (*, G) and (S, G) IP multicast groups, wherein (*, G) represents a common shared tree structure of a multicast distribution tree, (S, G) represents a shortest path tree structure of the multicast distribution tree, * represents all sources, S represents an IP address of one of the sources, and G represents a multicast group address.

6. A network device for managing multicast scaling, comprising:
   a processor; and
   a memory storing instructions executable by the processor to cause the processor to:
   receive a request message to join an Internet Protocol (IP) multicast group;
   in response to receipt of the request message to join the IP multicast group, determine whether a hardware filter is available on the network device to process the request message; and
   in response to a determination that no hardware filter is available to process the request message, change a current state of an IP multicast protocol associated with the request message to an error state on the network device, wherein in the error state, further request messages to join the IP multicast group that are received by the network device are discarded by the network device.

7. The network device of claim 6, wherein the request message includes an Internet Group Management Protocol (IGMP) join message.

8. The network device of claim 6, wherein the request message includes a Multicast Listener Discovery (MLD) protocol join message.

9. The network device of claim 6, further comprising an interface to receive a command to exit the error state.

10. The network device of claim 6, wherein in the error state, IP multicast messages received by the network device are flooded to all ports of the network device.

11. A non-transitory machine-readable storage medium comprising instructions to manage multicast scaling, the instructions executable by a processor of a network device to:
   receive a request message to join an Internet Protocol (IP) multicast group;
   in response to receipt of the request message to join the IP multicast group, determine whether any hardware filters for processing IP multicast messages on the network device are available to process the request message; and
   in response to a determination that no hardware filters are available to process the request message, change a current state of an IP multicast protocol associated with the request message to an error state on the network device, wherein in the error state, further request messages to join the IP multicast group that are received by the network device are discarded by the network device.

12. The storage medium of claim 11, wherein the instructions are to cause the processor to process the request message to join the IP multicast group prior to the error state.

13. The storage medium of claim 11, wherein the instructions are to cause the processor to delete filtered IP multicast group entries of the network device.

14. The storage medium of claim 13, wherein the instructions are to cause the processor to define a default filter as a flood filter in the network device prior to deletion of the filtered IP multicast group entries.

15. The storage medium of claim 11, wherein the instructions are to cause the processor to disable one of Internet Group Management Protocol (IGMP) and Multicast Listener Discovery (MLD) protocol configuration on the network device to exit the error state.

\* \* \* \* \*